United States Patent [19]

Treadwell

[11] 4,422,518

[45] Dec. 27, 1983

[54] VEHICLE SPEED CONTROL

[75] Inventor: William A. Treadwell, Battle Creek, Mich.

[73] Assignee: Eaton Corporation, Cleveland, Ohio

[21] Appl. No.: 389,655

[22] Filed: Jun. 18, 1982

Related U.S. Application Data

[62] Division of Ser. No. 50,237, Jun. 20, 1979, Pat. No. 4,346,775.

[51] Int. Cl.³ ............................................ B60K 31/00
[52] U.S. Cl. .................................. 180/175; 91/382; 91/385; 123/360
[58] Field of Search .............. 180/170, 175, 176, 177; 123/360, 389; 91/382, 385, 459

[56] References Cited

U.S. PATENT DOCUMENTS

| | | | |
|---|---|---|---|
| 3,298,482 | 1/1967 | Mueller et al. | 123/360 X |
| 3,437,167 | 4/1969 | Mueller | 123/360 X |
| 3,444,950 | 5/1969 | Uitvlugt | 123/360 X |
| 3,556,245 | 1/1971 | Radin | 123/360 X |
| 4,056,157 | 11/1977 | Kawata | 123/360 X |

Primary Examiner—David M. Mitchell
Assistant Examiner—Michael Mar
Attorney, Agent, or Firm—C. H. Grace; J. G. Lewis

[57] ABSTRACT

A pneumatically operated speed gonvernor (26) moves an engine throttle member (10) for controlling the speed of a vehicle. The governor includes a pneumatically operated actuator having an output connected to the engine throttle member. A pivotally mounted valve member (44) is positioned intermediate a vacuum supply orifice (46) and an atmospheric air orifice (48) and supplies a pneumatic signal to the actuator. An internal speed sensor (82) responsive to vehicle speed has an output member (100) which reacts against an improved, self-wiping minimum speed switch (102) and a set-speed control member (52) which in turn reacts against the pivotally mounted valve member (44) for varying the position of the valve member as the vehicle speed tends to fall below or rise above a predetermined set speed. An improved feedback lever (194) is connected between an output member of the actuator and the pivotally mounted valve member and has a dual cam profile (198) located about one end thereof which is engageable with a follower surface of the valve member. An improved vacuum release valve (126) is provided which disables the speed governor in its de-energized position.

2 Claims, 9 Drawing Figures

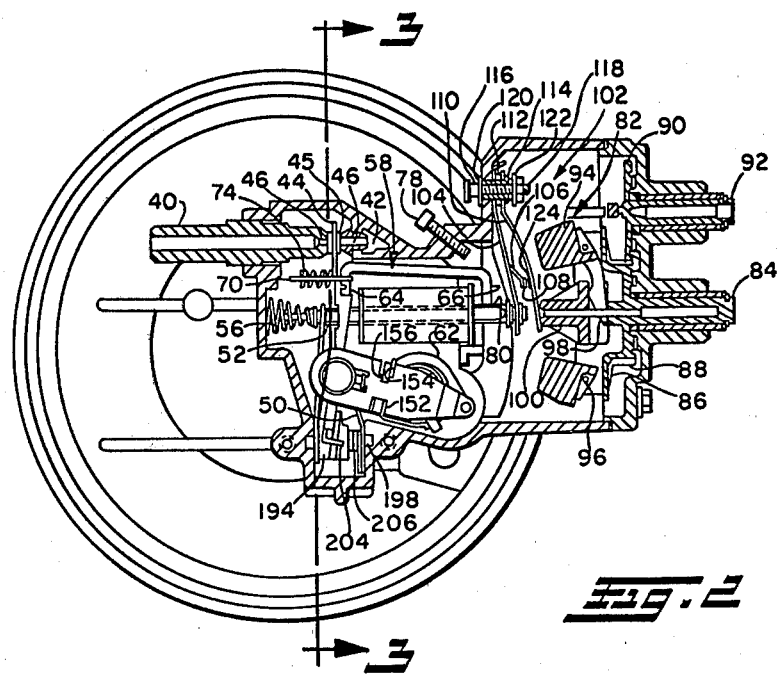
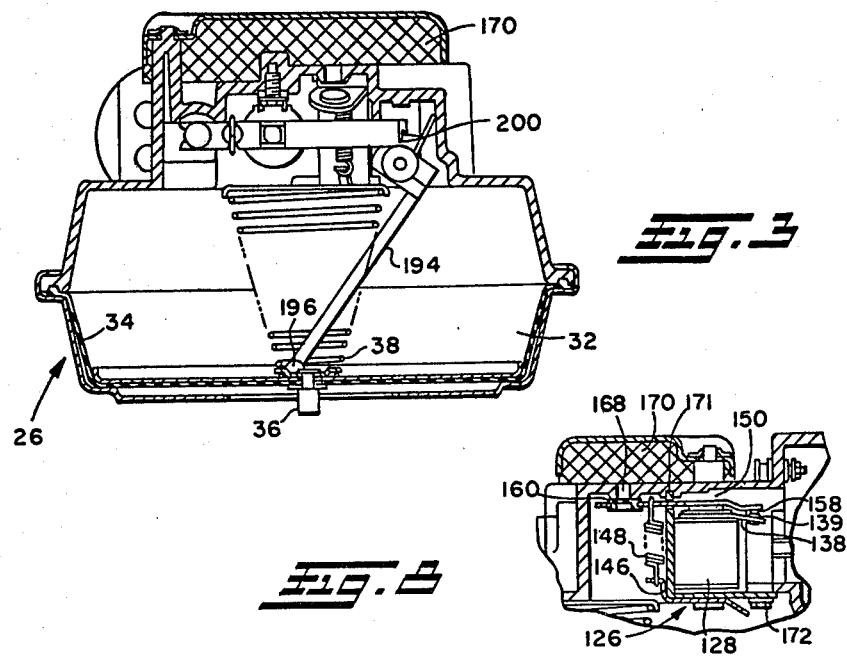

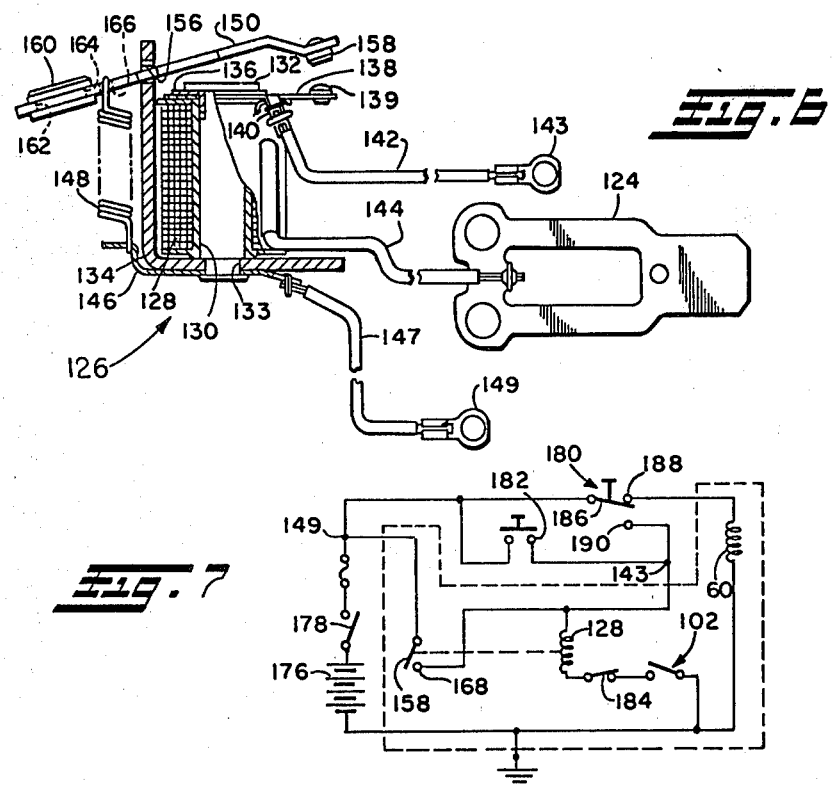
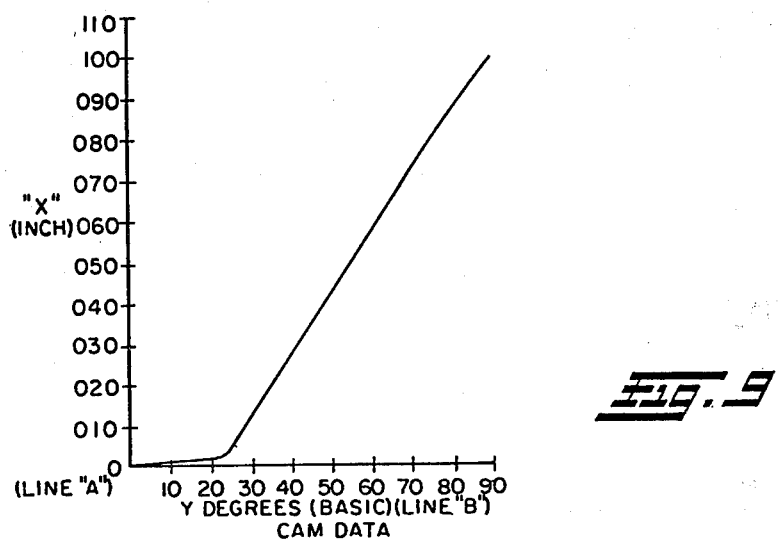

VEHICLE SPEED CONTROL

This is a division, of application Ser. No. 050,237, filed June 20, 1979, now U.S. Pat. No. 4,346,775.

BACKGROUND OF THE INVENTION

The present invention relates to vacuum operated vehicle speed governor mechanisms for controlling an engine throttle control member which in turn controls vehicle speed.

DESCRIPTION OF THE PRIOR ART

Vacuum operated speed governors are known in the art and have been provided with solenoid operated vacuum release valves for disabling the speed governor mechanism. In some of these devices the vacuum release valve comprises a solenoid coil which surrounds a valve passage. In one such known device described in U.S. Pat. No. 3,298,482 a pivotally mounted resilient lever formed of ferromagnetic material is connected to the pole frame of the solenoid and has intermediate its ends a valve member which is seated over the valve passage to block air flow therethrough upon energization of the solenoid. A return spring is connected to the lever adjacent its pivoted end and functions to keep the valve member spaced from the valve passage while the solenoid is de-energized, thereby venting the speed governor vacuum control chamber and disabling the governor. A shortcoming of this type of vacuum release valve is that each valve must be tested after final assembly at various voltage levels on the solenoid to determine whether the valve can tolerate the vibration levels experienced in actual service. If a release valve fails to meet the "open" or "closed" requirements at different voltage levels, it has hertofore been necessary to alter the tooling used to fabricate the lever in order to change the lever configuration. Thus there has arisen a need for providing a speed control release valve construction not requiring tooling alteration for adjustment and calibrattion of the valve.

Minimum speed switches are also incorporated into known speed governors for preventing governor operation at speeds below a predetermined minimum speed. In service, it has been found that after a large number of make and break cycles of the minimum speed switch experienced over the life of the device, a residue build up has occured on the switch contacts which has resulted in degradation of speed governor performance.

For "closed loop" servo control response, throttle position feedback lever arrangements have been provided in speed governors and it is known to include a pivotally mounted lever formed of wire having one end responsive to movement of the speed governor force output diaphragm connected to the throttle and the other end coiled around a mounting pin. The coiled end of the lever defines a helical cam which engages with a pivotally mounted valve member. The cam on the lever is engageable with a pivotally mounted valve member. In operation, as the lever rotates in response to the throttle actuator diaphragm movement, the cam functions to cause the valve member to move to a speed increasing or speed decreasing position relative to a vacuum passage and an atmospheric vent passage. However, under vehicle operating conditions wherein a full throttle condition is required, for example, in negotiating a steep hill, the magnitude of the feedback signal is sometimes inadequate to bring the vehicle quickly back to the set speed.

SUMMARY OF THE INVENTION

In the present invention a vacuum operated speed governor is provided having an improved minimum speed switch, feedback lever arrangement, and vacuum release valve.

The improved minimum speed switch includes a pair of switch contacts each mounted on a separate switch leaf. The switch leaves are mounted to the speed governor housing by a single fastener and separated by an insulated spacer. By mounting each leaf spring in a cantilever arrangement, and properly positioning each leaf at an angle relative to the other, deflection of one leaf toward the other will cause the contact members to engage in a wiping motion, thereby resulting in a cleaning or self-wiping action on the surface of the contact members. The wiping action achieved by the improved switch arrangement enables a low contact resistance to be maintained throughout the life of the speed governor.

The speed governor of the present invention also incorporates an improved feedback lever arrangement which includes an integrally molded plastic lever having a two stage cam profile. The two stage cam profile results in substantially eliminating feedback after the stroke of the speed governor output diaphragm has reached a predetermined value, thus allowing the speed governor to reach a full stroke condition at a smaller speed error than the prior art feedback lever design. This feature of the present invention enables the vehicle engine throttle to be opened wider to compensate for increased loads on the vehicle. The second stage portion of the two-stage feedback cam enables the speed governor to reach a position of stability.

An improved vacuum release valve is also incorporated into the speed governor of the present invention and comprises a solenoid operated lever having a flexible lever valve seat mounted on one end of the lever and a switch contact mounted on the opposite end, with the lever pivot point located intermediate the ends of the lever. A return spring is located on the valve member side of the lever and functions to space the flexible valve member from a raised annular valve seat provided on an atmospheric air passage which terminates within the speed governor housing. The switch contact end of the lever is angled toward an opposing switch contact which extends from the upper end of the electrical coil. Upon de-energization of the electrical coil, three spring release effects operate to open the valve thus insuring that the valve opens and is not sensitive to the effects of engine vibration. These three spring release effects are: the inherent resiliency in the flexible valve member, the biasing effect of the return spring, and the flexing of the spring leaf of the solenoid spring leaf, all of which tend to move the valve lever to an open position upon de-energization of the electrical coil. Another feature of the improved vacuum release valve is a plurality of paths for supplying electrical power to the release valve solenoid when the release valve is in the closed position. By directing current through the return spring and lever, through the exterior pole frame of the coil, and through the core of the coil, electrical continuity is positively insured in a low cost circuit arrangement.

BRIEF DESCRIPTION OF THE DRAWINGS

FIG. 2 is a sectional view of a portion of the speed governor mechanism shown in FIG. 1, taken approximately along the section line 2—2 of FIG. 1;

FIG. 3 is a sectional view of the speed governor mechanism shown in FIG. 2, taken approximately along section line 3—3 of FIG. 2;

FIG. 6 is an enlarged view of the vacuum release valve and one switch leaf of the low speed cut out switch of the device of FIGS. 1-3;

FIG. 7 is a schematic diagram of the electrical control circuit in the embodiment of FIGS. 1-3;

FIG. 8 is a partial cross sectional view similar to FIG. 1 showing the vacuum release valve in a closed position; and FIG. 9 is a graph of the feedback lever cam displacement versus angular displacement of the feedback lever of the embodiment of FIGS. 1-3.

DETAILED DESCRIPTION

Figure 1:
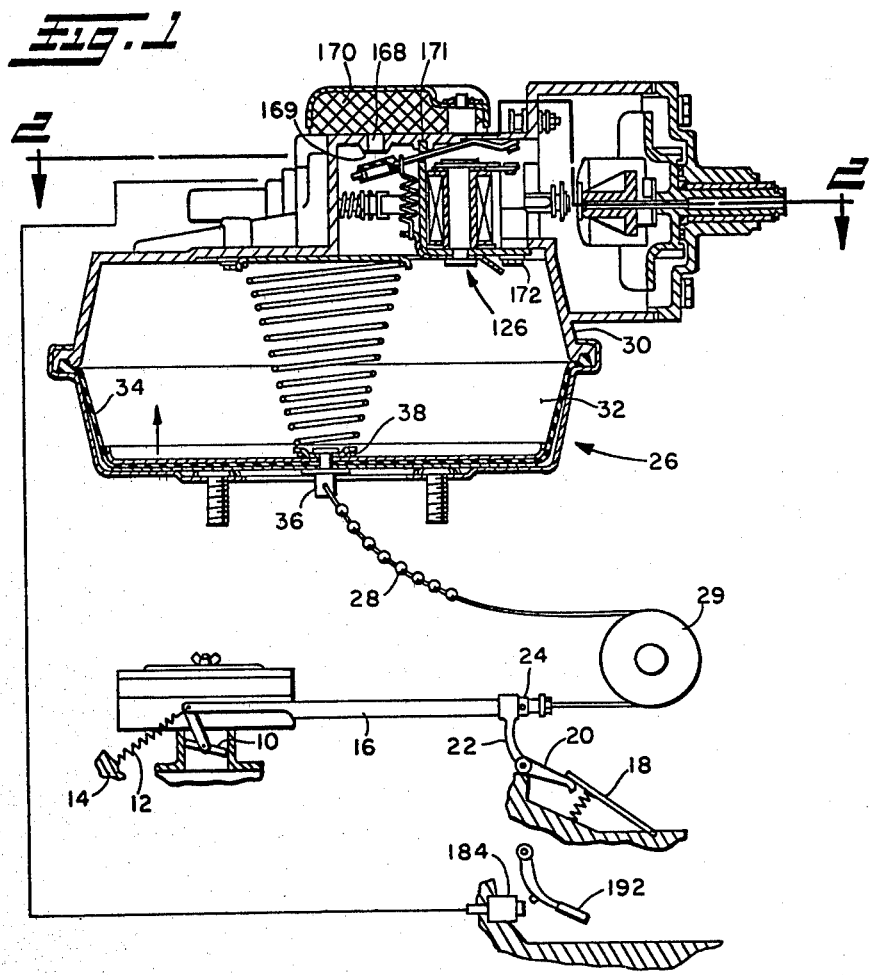
FIG. 1 is a schematic view illustrating a speed governor embodying the improvements of the present invention shown in association with a vehicle engine throttle control.

Referring now to FIG. 1, a throttle control member 10 of the automotive vehicle is movable from a closed position, illustrated in FIG. 1, to a fully open position in a throttle opening direction for increasing the vehicle speed and is moved in the reverse direction to a closed position for decreasing vehicle speed. Throttle member 10 is biased to a closed position by a spring 12 one end of which engages a suitable fixed support member 14 and the other end of which engages one end of a rod 16 which is connected to the throttle member 10. The rod 16 is connected to the throttle member 10 so as to effect movement of the throttle member 10 between its positions upon longitudinal movement thereof. As shown in FIG. 1, when rod 16 moves to the right, throttle member 10 is in its throttle open direction and when rod 16 moves to the left, throttle member 10 moves in a throttle closed direction.

Rod 16, as noted above, is biased by the spring 12 to the left and is moved to the right by depression of the accelerator throttle 18 of the vehicle. As throttle 18 is depressed, the spring 12 applies a greater force tending to bias the rod 16 against movement of the accelerator. The accelerator pedal 18, when depressed by the operator's foot, actuates a bell crank link member 20 in the embodiment shown in FIG. 1, and effects movement of an arm 22 thereof which forms a part of the link 20 toward the right. The arm 22 is slidably mounted on the rod 16 and engages a collar 24 thereon to effect movement of the rod 16 toward the right when the arm 22 moves toward the right thereby effecting movement of the throttle member 10 in a throttle opening direction.

Throttle 10 also may be moved in its throttle opening direction by means of a speed governor servoactuator unit, indicated generally at 26, which is operably connected to the rod 16, such as by means of a flexible chainlike member 28 chained around suitable pulleys 29, or alternatively, by means of a sheathed flexible tension cable (not shown) connected to the carburetor throttle lever by lost-motion linkage to permit manual override of the tension cable. The speed governor unit 26 is of the vacuum type and includes a housing 30 which defines in part a vacuum chamber 32, and supports a flexible diaphragm actuator 34 which forms a wall of the vacuum chamber 32. Diaphragm 34 is connected by means of a suitable clip 36 to the end of the chain member 28 opposite the end connected with the rod 16. Movement of the flexible diaphragm 34 in the direction of the arrow, shown in FIG. 1, effects movement of the rod 16 toward the right, in FIG. 1, and through the chain connection and causes movement of the throttle member in its throttle opening direction.

Diaphragm 34 is moved in the direction of the arrow shown in FIG. 1 is response to the creation of a vacuum in the vacuum chamber 32 and is biased to its position shown in FIG. 1 by means of a suitable spring 38 and spring 12. When the vacuum in the chamber 32 equals the force applied by springs 12 and 38, the diaphragm stops moving and is an equilibrium condition. If the vacuum is then either increased or decreased, the diaphragm will move. If the vehicle speed decreases, as when the vehicle goes up a hill, the vacuum will increase to move the diaphragm to increase the throttle opening. If the vehicle speed increases, as when the vehicle goes down a hill, the vacuum will decrease and the daiphragm will move so that spring 12 will decrease the throttle opening.

The vacuum in vacuum chamber 32 is provided with a suitable vacuum connection 40 (FIG. 2), in the housing 30 which is connected by suitable conduits, not shown, to the intake manifold of the vehicle to apply a vacuum thereat. Chamber 32 also communicates with the atmosphere through a suitable connection or sink port 42 (FIG. 2), spaced slightly from the vacuum connection 40 and opposite thereto.

The vacuum in chamber 32 is controlled by a valve member or flapper member 44 (FIG. 2), the operation of which will be described in detail hereinbelow but which, in general, controls the amount of communication of the vacuum connection 40 and atmospheric connection 42 with chamber 32. The valve or flapper member 44 is an elongated member which extends between nozzle-like openings 46, 48 connecting the vacuum and atmospheric connections 40, 42 with chamber 32. Flapper member 44 is movable relative to the nozzle openings 46, 48 and, when positioned adjacent to the nozzle opening 46, it substantially blocks communication between the vacuum conduit 40 and the vacuum chamber 32, and the chamber 32 is thus at substantially atmospheric pressure and the diaphragm member 34 is in the position shown in FIG. 1. When the flapper member 44 moves away from the nozzle 46, the vacuum connection 40 then communicates with the chamber 32 and a vacuum is established therein causing the diaphragm member 34 to move in its throttle opening direction (upward in FIG. 1) to effect opening movement of the throttle member 10.

In the presently preferred practice the flapper member 44 is a channel shaped member having a rubber valve member 45 connected to one end thereof. Valve member 45 extends between the adjacent nozzles 46 and 48, respectively. Flapper 44 is biased into engagement with the nozzle 46 by a suitable leaf spring 50 (shown partially in FIG. 2), thereby blocking communication between the vacuum connection 40 and the chamber 32. Flapper member 44 is moved to the right, as viewed in FIG. 2, when speed governor 26 is actuated in response to a decrease in vehicle speed. When this occurs, a vacuum is established in the chamber 32 in accordance with the amount of movement of the flapper member. This vacuum causes movement of the diaphragm member 34 in its throttle opening direction to hold the vehicle speed at the desired speed. The movement of the flapper member 44 is effected in response to movement of a core member 52, which moves right and left, as viewed in FIG. 2, in response to changes in vehicle speed. Core member 52 moves to the left, as viewed in FIG. 2, upon an increase in vehicle speed, and moves to the right, as viewed in FIG. 2, upon a decrease in vehicle speed, as will be described in detail hereinbelow. The left-hand of the core member as viewed in FIG. 2, extends slidably through an opening 54 in flapper member 44. A suitable spring member 56 is supported in the housing 30 and engages the left hand of the core member 52, as viewed in FIG. 2, and biases the core member 52 to the right.

The speed governor unit 26 includes a locking mechanism, indicated generally at 58, for selectively locking the core member 52 to the flapper member 44 to cause these members to move together so that when the core member moves in response to vehicle speed, flapper member 44 likewise moves. The locking mechanism 58 includes an electrical coil 60, encircling the core member 52. A suitable locking bracket member, or link member, 62 straddles the coil member 60 in end-to-end arrangement and is engageable with the core member 52 at the opposite axial ends of the coil member 60. The link member 62 is U-shaped and pads of legs 64 and 66 of the link member 62 engage the core member 52 when the coil 60 is energized.

Leg 64 of link 62 is pivotally supported intermediate its ends by a fulcrum extension 68 integrally formed into flapper member 44. As shown by FIG. 2, a reaction member 70 is looped about leg 64 and flapper member 44 and includes a spring guide extension (not shown) over which is mounted a biasing spring 74 which has one end reacting against reaction member 70 and the other end reacting against flapper member 44 such that fulcrum 68 is maintained in contact with a notch 76 formed in the left hand side of leg 64. Spring 74 and reaction member 70 also function to bias link 62 counterclockwise in FIG. 2 against an adjustable set screw 78 which is threadably received in housing 30.

In order to selectively lock the core member 52 to the flapper member 44, the coil 60 is energized causing, by magnetic attraction, movement of the link 62 clockwise from the FIG. 2 position. When the coil 60 is energized, the lower end of the leg 64 of link 62 first locks to the core member 52 and becomes a temporary fulcrum for link 62, whereupon the flapper member 44 and the link 62 pivot as a unit. Flapper member 44, due to the pivoting movement, moves from contact with the nozzle 46, and, as will be described in detail hereinbelow, moves to a position spaced from the nozzle 46 to thereby provide the appropriate vacuum in the chamber to hold the throttle member in a position producing the desired speed.

Link 62 then pivots about the fulcrum 68, with its opposite leg 66 moving down toward the core 52 to lock the latter to the flapper member 44. Thus, with the core member 52 locked to the flapper member 44 through the energization of the coil 60, upon a decrease in vehicle speed the flapper will move to the right, as viewed in FIG. 2, in unison with the core member 52. This causes movement of the flapper 44 from its position spaced from the nozzle 46 to a position closing nozzle 46 and effecting the creation of a greater vacuum in the chamber 32 and movement of the diaphragm 34 in its throttle opening direction.

A suitable leaf spring 80, shim, or other spacing means is preferably provided on the core member 52 and engages the lower end of leg 66 to assist in moving link 62 from the locking position as shown in FIG. 2 to a position (not shown) in which the link 62 is rotated counterclockwise and the lower end of link 66 is then spaced from core member 52.

As pointed out above, the vacuum in the vacuum chamber 32 is controlled by movement of the flapper 44 relative to the vacuum nozzle 46 upon movement of the core member 52. The core member 52 is moved in response to increases and decreases in speed of the vehicle by means of a vehicle speed sensing mechanism, generally indicated at 82. The mechanism 82 senses the speed of the vehicle and effects movement of the core member 52 in response to changes in speed. The mechanism 82 includes a suitable input drive connection 84 that can be connected with the transmission or front wheel of the vehicle and is driven at a speed in proportion to the speed of the vehicle. The connection 84 is a projection of a drive carriage 86 which has a gear portion 88. The gear portion 88 thereof meshes with a gear 90 having a shaft portion 92 connected thereto and which shaft portion is adapted to be connected with the vehicle speedometer.

The carriage 86 carries a plurality of weight members 94 which are pivotally supported on the carriage 86 by means of suitable pins 96 which extend through the weights and through suitable projecting portions of carriage 86. The weight members 94 have arm portions 98 which extend toward the axis of rotation of the carriage 86 and into notches in a suitable drive coupling 100. The drive coupling 100 is rotated by the arm portions 98 of the weights upon rotation of the weight members 94 and is movable axially upon movement of these arm portions axially. The arm portions 98 of the weight members 94 move axially due to centrifugal force upon changes in the speed of rotation of the carriage 86 which occurs when vehicle speed varies.

In accordance with one aspect of the present invention, a self-cleaning switch arrangement, indicated generally at 102 in FIG. 2, is positioned to be operated by the drive coupling 100 of the speed sensing mechanism 82. As shown in FIG. 2, the switch 102 includes a first switch leaf 104 formed of a suitable flexible and electrically conductive material having its upper end connected to housing 30 and its lower end connected to the right end of core member 52 such that as core member 52 moves left or right, switch leaf 104 flexes or pivots about its upper end. An extension arm 106 is formed integrally with first leaf 104 and has connected to the end thereof a first switch contact member 108. The upper end of leaf 104 extends upwardly away from housing 30 and is adapted for connection to a ground connection. A second switch leaf 110 has its upper end fixed and connected adjacent the upper end of leaf 104. A spacer 112 formed of a suitable dielectric material is positioned intermediate the upper ends of leaves 110 and 104. A tubular insulator 114 extends through openings in the switch leaves and through an opening in housing 30. An electrical terminal 116 has a threaded portion 118 which extends through tubular insert 114. A nut 119 clamps and secures the switch leaves between a pair of washers 120 and 122, thereby securing the switch leaves to the housing. Another terminal (not shown) below terminal 116 is connected in a similar manner. This method of attachment insulates leaves 104 and 110 from incoming electrical power through terminal 116 and permits these components to be assembled as a unit, thereby eliminating a separate connection for each. Second leaf 110 is formed to extend rightwardly toward drive coupling 100. A second switch contact member 124 is connected to leaf 110 opposite switch contact member 108.

FIG. 2 shows the position of the switch leaves and contact members before the speed sensing mechanism 82 has attained a speed high enough to close the swith 102. As the vehicle speed increases, the drive coupling 100 in the speed sensing mechanism 82 will move axially to the left in FIG. 2, forcing the lower end of second switch leaf 110 to the left until contact member 124 engages with switch contact 108. As leaf 110 continues moving toward leaf 104, switch contacts 108 and 124 will experience a relative motion or sliding action due to the offset mounting arrangement of the switch leaves. As explained hereinafter, the switch 102 functions has a minimum speed switch for the speed governor such that the governor unit 26 can be used to regulate the vehicle speed only after the vehicle reaches a predetermined minimum speed.

In accordance with another aspect of the present invention, an improved vacuum release valve indicated generally at 126 (FIG. 1 and FIG. 6) is provided for rendering the speed governor unit 26 either operable or inoperable to control the vehicle speed. Release valve 126 is mounted on speed governor housing 30 which is in communication with the vacuum chamber 32.

As shown in greater detail in FIG. 6, vacuum release or dump valve 126 includes a solenoid coil 128 carried by a flanged annular housing 130 of suitable dielectric material. A tubular core 132 formed of ferromagnetic material extends through the central portion of coil 128 and is snugly in contact with the central opening through flanged housing 130. The upper end of core 132 is flanged and its lower end extends through an opening 133 in an an L-shaped pole piece 134 which extends along the side and lower end of coil 128. An insulating insert 136 is positioned beneath the flange of core 132 and is in abutment with a switch leaf 138. A switch contact 139 is connected to the free end of leaf 138. Switch leaf 138 includes an extension 140 which has electrically connected thereto one end of the coil winding 128 and also a lead 142 which terminates in an eyelet 143. A lead 144 has one end thereof connected to the other end of coil winding 128 and the other end thereof connected to second switch leaf 110. An electrically conductive spring retainer 146 is positioned adjacent the lower surface of pole piece 134 and has an opening therein which fits over the lower end of core 132. The lower end of core 132 is deformed as, for example, by spin riveting over thr surface of retainer 146, thereby clamping the above described components together. One end of retainer 146 is connected to a lead 147 and the other end thereof extends through an eyelet of a return spring 148. Lead 147 terminates in an eyelet 149.

A lever 150 formed of ferromagnetic material is pivotally mounted on the upper end of pole piece 134 and retained thereon by means of slots 152 and 154 in lever 150 and a slot 156 in the pole piece (shown generally in FIG. 2). A switch contact 158 is connected to the right end of lever 150. A valve member, defined by a rubber plug or dump poppet 160, is received in an opening 162 formed in lever 150 and connected thereto by means of a groove 164, the sides of which overlap the edge of opening 162. Return spring 148 has its upper end looped over a tab 166 formed in lever 150 and functions to bias lever 150 in a counterclockwise direction.

As shown in FIG. 1, a valve passage or dump port 168 is formed in housing 30 and aligned with the pivotal movement of valve member 160 and functions when unobstructed to communicate atmospheric air into vacuum chamber 32. The lower end of passage 168 terminates in a tapered extension valve seat 169. A filter 170 is positioned over passage 168 for filtering atmospheric air flowing to vacuum chamber 32. Vacuum release valve 126 is connected to housing 30 by means of screws 172 which clamp pole piece 134 thereto. The upper end of L-shaped pole piece 134 is seated in a groove 171 integrally molded into housing 30. Screws 172 clamp the pole piece against the housing and into groove 171, thereby mounting the valve 126 thereto.

When coil 128 is in its de-energized condition, return spring 148 rotates lever 150 counterclockwise until the right end of the lever 150 abuts a portion of the inner wall of housing 30 as shown FIG. 1.

FIG. 8 shows the position of the vacuum release valve 126 when coil 128 is energized. At this time, lever 150 is held by magnetic attraction against the top surface of core 132 thus placing valve member 160 in sealing engagement with valve seat 169 and closing switch contacts 139 and 158. Vacuum chamber 32 is then isolated from atmospheric air.

While contacts 139 and 158 are closed, electrical power is supplied to coil 128 from lead 147 by current flowing through lead 147 by parallel paths defined by: retainer 146, spring 148, and lever 150; retainer 146, core 132, and leaf 138; retainer 146, pole piece 134 and lever 150.

When coil 128 is de-energized, the combined spring releasing effects of valve member 160 against valve seat 169, the return biasing effect of spring 148, and the flexibility of leaf 138 all contribute to move lever 150 in a counterclockwise direction to insure that the vacuum release valve moves to an open position.

Vacuum release valve coil 128 and the minimum speed switch 102 are connected in the electrical control circuit of the present speed governor, as shown schematically in FIG. 7. Inside the dashed line of FIG. 7 is the circuitry associated with the speed governor, while that portion of the schematic outside of the dashed lines corresponds to the vehicle wiring and turn signal control switch which will now be described in greater detail. This circuit includes the previously described locking coil 60, the vacuum release coil 128, the minimum speed switch 102, and switch contacts 139 and 158 operated by release coil 128. This circuit also includes the vehicle battery 176, the vehicle ignition switch 178, a speed set switch 180, a speed resume switch 182, and a brake pedal switch 184.

The speed set switch 180 has a mobile contact 186 which normally engages a fixed contact 188 to complete an energization circuit for the lock-in coil 60 from the battery 176 through the ignition switch 178. The speed set switch 180 has a normally open fixed contact 190 connected to the release coil 128.

The speed resume switch 182 is normally open and is connected in parallel with the normally open contacts 186, 190 of the speed set switch 180. The brake pedal switch 184 is normally closed and it is positioned to be opened by the brake pedal 192 (FIG. 1) of the vehicle when the brake is applied.

In the operation of this circuit, when the vehicle operator closes the ignition switch 178 upon starting the vehicle, an energization circuit for the lock-in coil 60 is completed from a battery 176 through the now closed ignition switch 178 and the normally closed contacts 186, 188 of the speed set switch 180. The energization of the lock-in coil 60 by speed set switch 180 immediately causes the core member 52 to be locked in the flapper locking mechanism 44 by member 58. However, it should be understood that the release coil 128 for closing off the passage 168 to the atmosphere has not, as yet, been energized, and therefore no speed control may take place. The minimum speed switch 102 stays open until vehicle speed exceeds the predetermined minimum speed (e.g., 25 miles per hour), at which time it closes.

If it is desired to activate the speed governor mechanism in order to maintain the vehicle at a predetermined driving speed, the operator must bring the vehicle up to the desired speed and while at the speed actuate the speed set switch 180 to close its contacts 186 and 190 and to open the circuit to the lock-in coil 60.

This actuation of the speed set switch 180 also completes an energization circuit for release coil 128 from battery 176, through the ignition switch 178, the now closed contacts 186, 190 of switch 180, coil 128 and the now closed minimum speed switch 102 to ground. Such energization of coil 128 also causes the relief valve member 160 to close, as described, sealing off the vacuum chamber 32 in the speed governor unit 26 from the atmosphere.

When the operator releases the speed set switch 180, its contacts 186, 188 close again to again energize the lock-in coil 60. Such energization of the lock-in coil 60 causes the core 52 to be locked to the flapper 44 by locking mechanism 58, as described, so that the speed governor unit now regulates the vehicle speed.

After the speed set switch 180 is released, the release coil 128 remains energized through the described holding circuit. If the vehicle operator depresses the brake pedal 192, this will open the normally closed brake pedal switch 184, breaking the holding circuit for the release coil 128. Consequently the release coil 128 will be de-energized and the release valve member 160 will move to its open position connecting the vacuum chamber 32 in the speed governor unit 26 to the atmosphere and thereby rendering the speed governor unit inoperative to control the vehicle speed. If now the operator releases the brake pedal when the vehicle speed exceeds the predetermined minimum speed to effect closing of switch 102, as described, the operator may re-establish the control of the speed governor unit 26 over the vehicle speed by closing the RESUME switch 182, which completes an energization circuit for the release coil 128.

The energization of the release coil 128 is at all times under the control of the minimum speed switch 102 such that opening of switch 102 at any time will render the governor unit 26 inoperative to regulate the vehicle speed. Failure of the speedometer drive cable will cause the speed sensing mechamism 82 to open switch 102 and render the governor unit 26 inoperative. Such failure of the speedometer speed cable will cause the drive coupling 100 to move to the right in FIG. 2, permitting core 52 to move to the right to establish the maximum throttle opening position of flapper member 44. That is, core 52 would sense such failure as an underspeed condition of the vehicle. However, the opening of switch 102 under these conditions will render the governor unit 26 inoperative and will prevent the vehicle speed from increasing under the control of core 52.

In view of the volume of air in the vacuum chamber 32 which must be evacuated in order to obtain movement of the diaphragm member 34 and in order to achieve accurate positioning of the diaphragm member 34 to its position corresponding to the desired speed, the speed governor unit 26 is constructed so as to effect rapid operation and quick movement of the diaphragm member 34 and is constructed so that the flapper member 44 moves an amount greater than that which is necessary to effect movement of the diaphragm member to its position to maintain the vehicle at the desired speed on level terrain.

Figure 4:
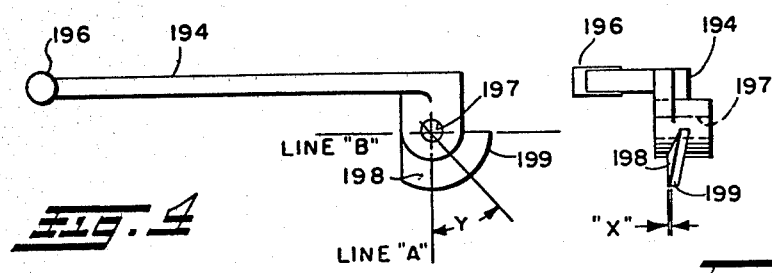
FIG. 4 is a side view in elevation of the feedback lever of the embodiment of FIGS. 1-3 and shows its cam profile.
Figure 5:
FIG. 5 is an end view of the feedback lever taken from the right side of at FIG. 4 illustrating a portion of the cam profile.

To perform this operation, the speed governor unit 26 includes an improved feedback mechanism for positioning the flapper 44 in accordance with the position of the diaphragm 34. The feedback mechanism which is connected between the diaphragm 34 and the flapper 44 includes a means for moving the flapper 44 toward the vacuum nozzle 46 as the diaphragm member 34 moves in its throttle opening direction independent of the sensing means which moves the core 52. As shown in FIGS. 1 and 3, this mechanism includes a lever 194 which has a follower end 196 riding on diaphragm 34. A transverse mounting hole 197 is formed through the other end thereof. A pin 195 extends through hole 197 and is mounted in housing 30. As shown in greater detail in FIGS. 4 and 5, the rotatably mounted end of lever 194 includes a varying helical cam profile 198 defined by a curved flange 199. The effective cam surface of profile 198 is within an angular displacement defined by reference lines "A" and "B" of FIG. 4. FIG. 5 identifies a distance "X" which measures axial advance of a point on cam 198 for a given angular displacement "Y" from line A as viewed in FIG. 4.

A slot 200, shown partially in FIG. 3, is formed into the lower edge of a right angle bend portion 204 on flapper 44. Slot 200 fits over flange 199. A torsion spring 206 is wound about pin 195 and is engageable with lever 194. Spring 206 maintains lever 194 biased in a counterclockwise direction in FIG. 3 such that follower end 196 remains in contact with diaphragm 34.

FIG. 9 is a graph of displacement X versus angular displacement Y of cam 198. As can be seen from the graph, cam profile 198 has a first zone between zero degrees to approximately 23 degrees in which the helix angle is small and a second zone between 23 degrees to 90 degrees in which the helix angle is substantially greater. The 0 degree position is represented by the lever as positioned in FIG. 3. The effect of this varying cam profile will be described in greater detail below.

When the diaphragm member 34 moves in its throttle opening direction, the feedback lever 194 moves and pivots about pin 195 and the cam profile 198 reacts against slot 200 causing the lower end of flapper 44 to move to the right in FIG. 2. The upper end of the flapper member 44 and valve member 45, however, move toward vacuum nozzle 46.

Prior to energization of the lock-in coil 60, the valve member 45 is in engagement with vacuum nozzle 46 and the vacuum chamber 32 is in communication with the atmosphere through the nozzle 48. Upon energization of the lock-in coil 60, the flapper member 44 is pivoted, as described hereinabove, and valve member 45 is moved away from the vacuum nozzle 46 to a position between vacuum nozzle 46 and vent nozzle 48. When flapper 44 is in this position, a vacuum is applied to chamber 32 and the diaphragm member 34 begins to move in a speed increasing direction. As the diaphragm member 34 moves in a speed increasing direction due to the operation of the feedback mechanism, valve member 45 moves toward the vacuum nozzle 46.

Flapper member 44 will move toward the vacuum nozzle 46 as long as the diaphragm 34 continues to move, and diaphragm 34 will continue to move as long as the vacuum in the chamber 32 is sufficient to overcome the bias of the springs 38 and 12 which resist movement of the diaphragm member. As the valve member 45 moves toward the vacuum nozzle 46, the vacuum in the vacuum chamber 32 acting on the diaphragm member 34 is reduced and the movement of the flapper 44 toward the vacuum nozzle 46 stops when the vacuum in the vacuum chamber substantially equals the force applied by the springs 12 and 38 to the diaphragm member, in which condition the diaphragm member is, in an equilibrium state with the vacuum acting to move the diaphragm member in one direction and the springs acting to move the diaphragm member in the opposite direction. Since the force applied by the spring 12 to the diaphragm member will vary depending upon the speed at which the vehicle is driven, the position of flapper member 44 for any given speed will vary as noted hereinabove.

In the event that the vehicle speed decreases the flapper member 44 will move with the core member 52 to the right, as described hereinabove, and away from the vacuum nozzle 46. This will cause a greater vacuum to be applied to the vacuum chamber 32 and cause the diaphragm member 34 to move in a throttle increasing direction to thereby increase the speed of the vehicle. Movement of the diaphragm member in the throttle increasing direction, causes the flapper member 44 to move toward the vacuum nozzle 46 because of the clockwise rotation of feedback lever 194 (relative to FIG. 3) which causes the slot end of flapper 44 to move to the right (relative to FIG. 2). If the set speed of the vehicle is around 40 miles per hour and the speed drops about 4 miles per hour below set speed, or if the vehicle is cruising at 70 miles per hour and the speed drops one or two miles per hour below set speed, the cam profile will engage flapper 44 at an angular displacement above 23 degrees producing displacement. As shown by the graph of FIG. 9. The diaphragm member continues to move until it again achieves its equilibrium status described hereinabove, and at this time the flapper member 44 will be in a position to maintain the vehicle in the desired or preset speed. In the event that it is desired to increase the vehicle speed above the preset and locked in speed, the operator may depress the accelerator pedal 18 to increase the vehicle speed above the desired speed. As the vehicle speed increases, the flapper member 44 moves toward the vacuum nozzle 46 and the diaphragm member 34 moves downward in FIG. 1 when the operator moves his foot from the accelerator pedal 18 and the vehicle speed is decreased, the flapper member 44 will move away from the vacuum nozzle 46 due to movement of the core member 52 to the right, as viewed in the drawings, and the diaphragm member 34 will move in its speed increasing direction until it again achieves the equilibrium state discussed above.

In the presently preferred practice, if during vehicle operation, the load on the vehicle becomes significant, for example, due to climbing a steep hill or pulling a heavy load, and the vehicle speed falls more than four miles per hour below the set speed of forty miles per hour or more than two miles per hour below the set speed of seventy miles per hour, the core member 52 will be moved toward the right in FIG. 2 allowing a vacuum to be communicated to vacuum chamber 32 which results in upward movement of diaphragm 34 which moves the throttle to an open position thereby increasing engine output power. Under this operating condition the stroke of diaphragm 34 will move an amount sufficient to rotate feedback lever 194 such that the cam surface designated between 0 degrees and 23 degrees on the FIG. 9 graph engages the flapper 44. With lever 194 in this range of positions relative to flapper member 44, the amount that lever 194 moves valve member 45 toward vacuum nozzle 46 is reduced, thereby permitting the engine to remain in an increased throttle open position thus enabling the engine to meet the increased power demands.

Although the presently preferred practice of the invention has been described with respect to the foregoing specifically described embodiments, it will be apparent to those having ordinary skill in the art that modifications and variations of the invention may be made and the invention is limited only by the following claims.

What is claimed is:

1. A pneumatically operated servoactuator for controlling a vehicle throttle to regulate the vehicle speed about a selected set speed, said servoactuator comprising:
   (a) a housing means defining a fluid pressure chamber including means defining a fluid pressure source port adapted for connection to a source of fluid pressure and a fluid sink port adapted for connection to the atmosphere;
   (b) actuator means movably responsive to the pressures in said chamber and including an output member adapted for connection to the vehicle throttle;
   (c) valve means including a member movable with respect to said source and sink port for controlling fluid pressure in said chamber, said valve means being selectively responsive to a vehicle speed sensor;
   (d) circuit means defining a stationary electrical contact;
   (e) dump valve means including:
      (i) an auxiliary dump port in said chamber;
      (ii) an elongated valve member of ferromagnetic material mounted intermediate its ends for pivotal movement with respect to said housing means, said member having a dump poppet disposed on one side of the pivotal mount for valving said dump port and a movable electrical contact means disposed on the opposite side of said pivotal mount;
      (iii) means biasing said dump valve member in a direction to move said dump poppet to a position opening said dump port;
      (iv) electromagnetic means operable upon actuation to magnetically attract said valve member and cause pivotal movement thereof in a direction closing said dump port with said poppet wherein said movement of said valve member causes closing of said movable electrical contact with respect to said stationary contact; wherein said circuit means employs plural paths electrically common through said pivotal mount and pole frame and through said biasing means.

2. A pneumatically operated servoactuator for controlling throttle movement for a vehicle speed control comprising:
   (a) housing means defining a fluid pressure chamber and a source port adapted for connection to a source of fluid pressure and a sink port communicating with the atmosphere;
   (b) modulator valve means including a movable member operable in response to a vehicle speed sensor to control flow through said source and sink ports for controlling fluid pressure in said chamber;
   (c) actuator means including an output member adapted for connection to a vehicle throttle movably responsive to the pressure in said chamber;
   (d) feedback tactile means operable to mechanically sense movement of said pressure responsive means and to variably bias said valve member, said feedback means providing a first rate of bias for movements of said pressure responsive means less than a predetermined value and a second rate of bias for movements of said pressure responsive means above said value, said feedback means including a lever having one end thereof operably in contact with said pressure responsive means and movable therewith and the other end thereof rotatably mounted, said lever defining a cam surface disposed about said rotatably mounted end, said valve member having a portion thereof engagable with said cam surface and movable thereby as said lever rotates, said cam surface defining a first surface portion in which said valve member is movable a first amount relative to said source port proportional to the rotation of said lever and a second surface portion in which said feedback lever is movable a second amount relative to said source port proportional to the rotation of said lever, said second amount being substantially less than said first amount, said second surface portion engagable with said portion of said valve member as said pressure responsive means moves beyond a predetermined minimum throttle open position.

* * * * *